United States Patent

[11] 3,603,767

| [72] | Inventor | Edward A. Scicchitano<br>Towson, Md. |
|---|---|---|
| [21] | Appl. No. | 854,893 |
| [22] | Filed | Sept. 3, 1969 |
| [45] | Patented | Sept. 7, 1971 |
| [73] | Assignee | Dynatherm Corporation<br>Cockeysville, Md. |

[54] ISOTHERMAL COOKING OR HEATING DEVICE
10 Claims, 5 Drawing Figs.

[52] U.S. Cl. .................................................. 219/439,
165/105, 219/326, 219/401, 219/430, 219/530, 219/540
[51] Int. Cl. .................................................. F27d 11/02
[50] Field of Search .................................... 219/401,
439, 437, 430, 440–441, 325–326, 530, 540;
165/105, 47; 126/246

[56] References Cited
UNITED STATES PATENTS

| 3,519,067 | 7/1970 | Schmidt ........................ | 165/105 X |
| 3,528,494 | 9/1970 | Levedahl ....................... | 165/105 |
| 3,532,158 | 10/1970 | Hiebert ......................... | 165/47 |
| 2,236,837 | 4/1941 | Rimmel ......................... | 219/430 X |
| 2,279,000 | 4/1942 | Larson .......................... | 219/439 |
| 3,148,676 | 9/1964 | Truog et al. ................... | 126/246 |
| 3,152,774 | 10/1964 | Wyatt ............................ | 165/105 X |
| 3,229,759 | 1/1966 | Grover .......................... | 165/105 |
| 3,243,613 | 3/1966 | Grover .......................... | 165/105 UX |
| 3,431,396 | 3/1969 | Kodaira ......................... | 219/326 |

FOREIGN PATENTS

| 258,804 | 5/1949 | Switzerland ................... | 219/439 |

*Primary Examiner*—Volodymyr Y. Mayewsky
*Attorney*—A. H. Caser

ABSTRACT: An improved cooking or heating device adapted for many applications, particularly for cooking, and useful to heat many substances, as in the chemical industry. The device is isothermal and incorporates a heat pipe principal.

PATENTED SEP 7 1971 3,603,767

INVENTOR
EDWARD A. SCICCHITANO
BY
A. H. Caser
ATTORNEY

ISOTHERMAL COOKING OR HEATING DEVICE

BACKGROUND OF THE INVENTION

1. The field of the invention comprises cooking or heating devices.

2. The old-fashioned double boiler comprises two pans or kettles, one disposed inside of and supported on the other, with the outer one containing water that is heated to boiling. The inner pan contains the food to be prepared and is heated by the steam from the boiling water. The space between the two pans is not vaportight, and at least some of the steam escapes, so that in time the water in the outer pan must be replaced. Another disadvantage is that over a period of time the food may be cooked at only one temperature, that of boiling water. In contrast to the double boiler, the invention provides a device in which the working material or fluid does not escape, and in which food or other substances may be isothermally heated at any predetermined temperature within a given range.

SUMMARY OF THE INVENTION

The device comprises a surface for supporting and heating a substance to be heated, a sealed evacuated reservoir beneath the surface, capillary means in the reservoir in substantial contact with the underside of the surface, and a working material or agent in the reservoir which is heatable to form vapors which condense on said underside and which give up latent heat of condensation thereto, thereby to maintain said surface at a substantially uniform elevated temperature. The condensed vapors are drained from the said underside by the capillary means. In a preferred form the device also incorporates a heat source for heating the agent, although heat may be applied from any suitable source which may or may not form a part of the device.

BRIEF DESCRIPTION OF THE DRAWINGS

The invention is illustrated in the accompanying drawings, which are diagrammatic, and in which.

DESCRIPTION OF THE SPECIFIC EMBODIMENTS

Figure 1:
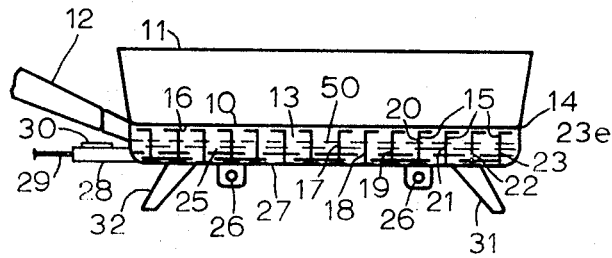
FIG. 1 is a side view of the device showing the interior construction.

Referring to FIG. 1, the device of the invention is shown in the form of a fry pan having a heatable surface 10 which supports a substance to be heated and which transfers heat thereto. The pan also comprises the sidewall or walls 11 and a handle partially shown at 12. Beneath surface 10 and in heat exchange relation therewith is a sealed evacuated reservoir or chamber 13 which forms an integral part of the pan, as by being welded thereto along the seam 14. Capillary means, comprising the structure generally indicated at 15, is present in the reservoir and is substantially in contact with the underside 16 of surface 10.

Figure 2:
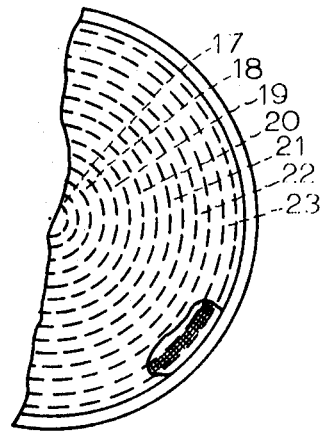
FIG. 2 is a plan view of the device with part of the construction omitted and part broken away.
Figure 3:
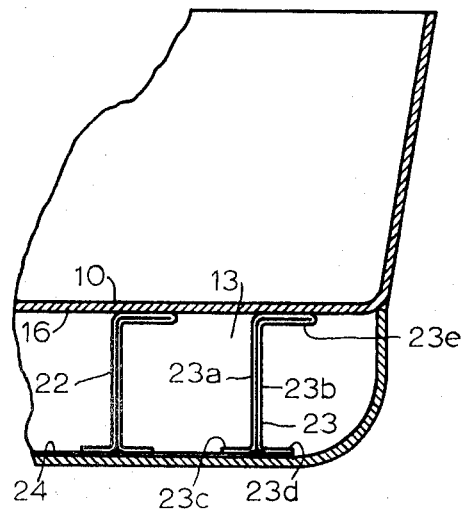
FIG. 3 is an enlarged partial sectional view of the device.

While the capillary means or structure may be of any suitable form, in the embodiment shown it comprises seven concentric courses or rings of fine mesh screen, indicated at 17, 18, 19, 20, 21, 22, and 23, which extend from bottom to top of the reservoir. Collectively, these rings may also be referred to as a porous wick. As the construction of the rings is the same, except for their diameters, ring 23 (FIG. 2 and 3) may be described in detail. It is made from a strip of screen that has been folded over on itself to form two sides, 23a and 23b, except that lateral side portions of the strip are left unfolded, as at 23c and 23d. Portions 23c and 23d, which form the bottom of the ring, are used to attach it, as by welding, to a baseplate 24. At its upper portion the ring is partially folded over, forming the annular shoulder or flange 23e, by means of which the ring makes contact with the underside 16 of surface 10. In FIG. 1 the shoulder 23e is, for clarity, shown as spaced from the underside 16, but it is to be understood that it is in actual contact therewith, as in FIG. 3.

It will be understood that the capillary structure may be integrally secured to, or formed with, either of the opposed surfaces 24 or 16, or with both; also it need not necessarily make contact with both top and bottom of the reservoir, although it should be in contact with at least the top, i.e., the underside 16.

At 25 (FIG. 1) a working material or agent is shown, and preferably this agent is in the liquid state at ambient temperatures and pressures. It is present in an amount to saturate the capillary structure 15 and to provide some excess which accumulates in the bottom of the reservoir. As indicated, agent 25 is heatable to form vapors which then condense on the underside 16, giving up latent heat of condensation to such underside, and in this way the surface 10 is heated to and maintained at a substantially uniform elevated temperature. The condensed vapors are drained from the underside 16 by the capillary structure and flow back to the pool of agent 25.

The capillary structure thus acts to remove condensed vapors from tee underside 16, and while the force of gravity may also be assumed to be operative in this action, the capillary structure facilitates drainage of the liquid and eliminates any buildup of a thick liquid film on the underside 16 which would reduce heat transfer. The particular capillary structure shown, comprising the concentric rings of fine mesh screen, also facilitates transfer of the condensed liquid toward the bottom of the reservoir by virtue of capillary action, as the screen openings are sufficiently small to produce such action.

A source of heat for vaporizing the working agent is shown at 26 in the form of an electrical heating element of circular shape which is supported on and outwardly of the underside 27 of reservoir 13 by means not shown. As may be seen, the heat source 26 is in heat exchange relation with the agent. If desired, the heat source may also be disposed circumferentially of the outer surface of the reservoir, or in any other suitable configuration relatively thereto, and may be suitably insulated to protect users of the pan. Or it may be disposed within the reservoir, either circumferentially outwardly of the capillary structure, or below it, and in either case can be immersed in the agent. Other dispositions may be suitable, although a circumferential one is preferred. It will be understood that the circumferential element 26 may be of varying diameter to position it in any of the foregoing locations.

Means for varying the current input to the heating element are provided at 28 in the form of a conventional thermostat control which plugs in to the pan. Wire 29 connects the control 28 to a source of current, and this connection may be made, say, by plugging in the wire 29 to a receptacle not shown. With current flow established, one sets the dial 30 to a desired temperature, and when it is attained, current input is automatically turned off; and, of course, when the temperature falls below the dialled temperature, current input is automatically turned on. As is apparent, such heat control means permits selection of the operating temperature.

Legs 31 and 32 support the pan, and particularly the heating element, in spaced relation to a supporting surface.

As will be understood, the device does not necessarily have to have its own heat source as heat can be supplied by any suitable source, such as a stove upon which the pan, preferably legless, is placed, a gas burner, and the like. However, a pan incorporating its own heat source is advantageous and is preferred.

Figure 4:
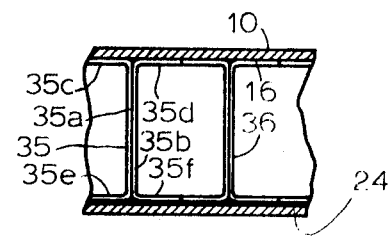
FIG. 4 is an enlarged sectional view showing a modification.

In FIG. 4 each ring, tow of which are shown at 35, 36, is formed of two like halves, note 35a and 35b. Two upper shoulders 35c and 35d are formed, both abutting the underside 16 of surface 10 and thus increasing the area of contact substantially throughout the underside 16. As described, two lateral side portions 35e and 35f are also present.

Figure 5:
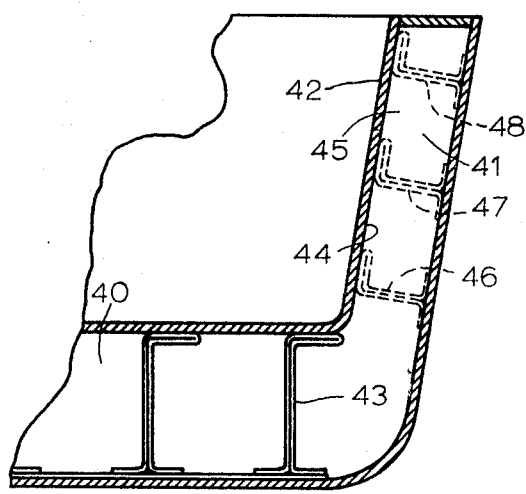
FIG. 5 is a view like FIG. 3 but showing modification and an optional arrangement affecting a part of the capillary means.

In FIG. 5, the reservoir 40 has an extension 41 which encircles the sidewall 42 of the pan outwardly of the outermost ring 43 of fine mesh screen. In this modification, vapors of working agent may condense on the outer surface 44 of sidewall 42, thereby heating wall 42, and the condensed vapors are drained from surface 44 by gravity. An optional construction, as indicated by broken lines, comprises disposing in the annular space 45 a plurality of rings 46, 47, and 48 of fine mesh screen, similar to ring 43, to aid in draining condensed vapors from the surface 44.

The reservoir 13, with its capillary structure or wick and working agent disposed between the heat source and the surface 10, comprises the essential elements of a heat pipe and operates on the heat pipe principle. There is a heat input section in the form of the heat source and the liquefied working agent in the bottom of the reservoir, a heat output section in the form of the surface 10, and a heat transfer section in the form of the intervening space between the heat source and surface 10, such space including the capillary structure and vapors of the working agent. Heat entering the system in the heat input section causes the agent to evaporate, and thus it gains heat by virtue of the latent heat of evaporization; the vapors pass across the intervening space to the underside 16 of surface 10 where, since such underside is at a slightly lower temperature than the heat input section, they condense, giving up heat of condensation; the condensed vapors return to the liquid in the bottom of the reservoir through the wick by virtue of capillary action; and the foregoing action is repeated. Since the evaporation and condensation actions are isothermal, the transport of heat from the heat input section to the heat output section takes place substantially isothermally.

The working agent may be chosen from a wide variety of organic and inorganic liquids. It should of course be one that can be vaporized in the range of temperatures prevailing in the reservoir 13, namely, about 100° to 500° F. Some suitable agents include o-dichlorobenzene, m-dichlorobenzene, water, and the like. The vapor pressure of the selected agent in the foregoing temperature range is generally in the vicinity of atmospheric pressure, preferably below atmospheric pressure, although it may range a few pounds per square inch higher, care being taken to stay well below the bursting strength of the device. The selected agent should not generate noncondensable gases by corrosion or decomposition mechanisms, and it should not of course affect the material of the fry pan. The amount of agent should be sufficient to wet the entire lower portion of the wick; suitably the level may be substantially as shown at 50 in FIG. 1. A preferred class of agents comprises those which vaporize at temperatures normally encountered in the cooking or heating devices described herein, and which, at boiling temperature, exhibit a pressure that is atmospheric or below.

Any suitable material may be used as the capillary structure provided that it has pores of a sufficiently small size as to promote or produce a capillary action. Some useful materials include woven cloth, fiber glass, porous metal, porous ceramic materials like tubes, wire screens, perforated metal sheets, and the like. Where circular wire screens are used, as in Fig. 1, they may be of varying width, and the number is also variable. The material of which the capillary structure is made is variable too, although it must be resistant to the working agent and to the temperature levels at which it is used.

EXAMPLE

A fry pan was constructed according to the invention having a diameter of about 12 inches and a depth of about 2 inches. The cooking surface and the reservoir were of aluminum, and the wick comprised seven concentric screens of stainless steel of about 200 mesh. Other mesh sizes are of course suitable. The rings were spaced from each other by a distance of about 0.5 inch. An electrical heating element was attached to the underside of the reservoir by brazing. All air and noncondensable gases were evacuated from the reservoir by means of a high vacuum pump, and then about 250 cc. of o-dichlorobenzene were introduced through a short filler tube (not shown in the drawings), after which the protruding end of the tube was sealed by welding. The handle was fixedly mounted to the pan in such a way as to conceal the tube, a recess being provided in the handle to receive the tube. The o-dichlorobenzene has a boiling point of about 180° C. (about 356° F.) at atmospheric pressure, so that the pan could be used to cook food at temperatures of up to 180° C. At 180° C. the pressure of the agent in the reservoir is approximately atmospheric, i.e., 14.7 p.s.i. A series of experiments were conducted with the pan in which the cooking surface was instrumented with thermocouples, and the control dial set at various temperatures ranging from 200 to 325° F.; temperature measurements were made at the various settings, and these established that the cooking surface was isothermal. The data are as follows:

| Control Setting, ° F. | 200 | 275 | 325 |
| --- | --- | --- | --- |
| Temperature in ° F. at: | | | |
| center of pan | 197 | 268 | 324 |
| outer edge | 206 | 273 | 326 |
| sidewall | 204 | 274 | 326 |

As the data shows, the pan operated substantially isothermally for each control setting. Note that at the 325° F. control setting, the temperature difference was only 1°.

In order to use the pan, the control dial is set at a desired temperature, say 250° F., and lead 29 (note FIG. 1) is connected to a source of current. With current flowing, heat is thus applied to the working agent until the temperature reaches 250° F., at which point the thermostat is operative to shut off the current flow. The vapors produced by the heated agent heat the underside of the cooking surface in the manner described. As the agent thus gives up heat, it is in turn cooled to a temperature below 250° F., at which point the thermostat is operative to turn on the current flow. In this way, the temperature is controlled to correspond to the dial setting. If the dial is set at 350° F., essentially the foregoing steps take place, although the initial current input is applied long enough to bring the temperature up to 350° F. The thermostat then acts to keep the temperature at 350° F. The dial may also be set at a lower temperature, say at 100° F., and the thermostat will control the temperature at this value. Dial settings below room temperature will not, of course, be effective.

In additional tests, meats such as bacon, steak, and hamburger were fried with noticeably less sticking and less splattering of fat than in the case of a conventional fry pan. It was considered that these improved results stemmed from the absence of hot spots, or local overheating.

It will be understood that in order to use the fry pan at a temperature substantially higher than 180° C., one will construct, or make use of, a pan which can withstand the higher internal pressure, or will use a working agent which boils at the desired temperature.

While the invention has been described in connection with a fry pan, it is applicable to cooking utensils in general, including pots, skillets, casseroles, bowls, kettles, boilers, steamers, roasters, tankards, cups, molds and forms, baking and chafing dishes, food warmers, plate warmers, and also flat plates and grills, including built-in grills. Any of the former may be a built-in device, i.e., incorporated in a cook stove and the like, and may be any shape and size. The invention is further applicable to laboratory equipment such as still pots, flask heaters, hotplates, and the like. It is applicable to larger scale heaters for use in the chemical, petroleum, fermentation, and other industries where large scale heating or distilling operations are performed. The material of which these various devices are constructed is variable and may be selected from those in conventional use as will as from any other material having desirable properties.

It will be understood that the invention is capable of obvious variations without departing from its scope.

In the light of the foregoing description, the following is claimed.

1. A cooking utensil comprising a heat-conducting wall for supporting and heating on the upper surface thereof a substance to be cooked, means for retaining cooking fluids on said surface, a sealed reservoir evacuated of all air and noncondensible gases disposed beneath said wall in heat exchange relation therewith, said reservoir being defined by said wall and also by a second wall spaced beneath the first wall, said second wall having a size and shape coextensive with that of the first wall, capillary means in said reservoir in contact with the underside of said first wall and extending toward the second wall, said capillary means comprising a porous structure, a working agent in the reservoir which in liquid form is flowable throughout the entire reservoir and is able to pass through and to saturate the porous capillary means, said agent being heatable to form vapors which condense on said underside of the first wall and which isothermally transfer latent heat of condensation thereto, thereby to maintain said first wall at a substantially uniform elevated temperature, said porous capillary means being permeable to said vapors so that the vapors are flowable throughout the entire reservoir and are condensable on the entire underside of the first wall, said agent at said elevated temperature having a vapor pressure in the vicinity of atmospheric pressure, thereby avoiding pressures which exceed the breaking strength of the utensil, said capillary means acting to drain said condensed vapors from said underside to avoid any buildup thereon of thick liquid films and also acting to facilitate transfer of the condensed vapors toward the bottom of said reservoir, an electrical heat source for heating said agent disposed on said utensil beneath said reservoir and out of contact with said agent, heat control means for said heat source to permit selection of the operating temperature of the utensil, and said utensil being capable of cooking a food in the substantial absence of local overheating or local hot spots and with reduced sticking and splattering in the case of a food conventionally subject to sticking and splattering.

2. An isothermal heat transfer device comprising a heat-conducting wall for supporting and heating on the upper surface thereof a substance to be heated, a sealed reservoir evacuated of all air and noncondensible gases disposed beneath said wall in heat exchange relation therewith, said reservoir being defined by said wall and also by a second heat-conductive wall spaced beneath the first wall, porous capillary means in said reservoir in contact with the underside of said first wall and extending toward the second wall, a working agent in the reservoir which in liquid form is flowable throughout the entire reservoir and is able to pass through and to saturate the porous capillary means, said agent being heatable to form vapors which condense on said underside of the first wall and which isothermally transfer latent heat of condensation thereto, thereby to maintain said first wall at a substantially uniform elevated temperature, said porous capillary means being permeable to said vapors so that the vapors are flowable throughout the entire reservoir and are condensable on the entire underside of said first wall, and said capillary means acting to drain said condensed vapors from said underside to avoid any buildup thereon of thick liquid films and also acting to facilitate transfer of the condensed vapors toward the bottom of said reservoir.

3. Device of claim 2 wherein a heat source is present thereon for heating said working agent.

4. Device of claim 3 wherein said heat source is disposed beneath said reservoir and out of contact with said agent.

5. Device of claim 4 wherein said capillary means comprises a plurality of rings of porous material.

6. Device of claim 5 wherein each said ring has upper and lower flanges which make contact with said first and second walls, respectively, of said reservoir.

7. Device of claim 6 at said elevated temperature having a vapor pressure in the vicinity of atmospheric pressure, thereby avoiding pressures which exceed the bursting strength of the device.

8. Device of claim 7 wherein said heat source comprises an electrical heating element, and wherein said heat source is provided with heat control means for selecting the operating temperature of the device.

9. Device of claim 8 wherein said first wall extends horizontally to lateral sides of the device, thereby providing said first wall with a surface area coextensive in size with that of said second wall, and wherein said first wall is capable of being heated to a uniform temperature which throughout the area thereof differs by as little as 20° F.

10. Device of claim 9 wherein said reservoir extends along lateral sides of the device and said capillary means is present in said extension, thereby to heat said sides to a substantially uniform elevated temperature.

UNITED STATES PATENT OFFICE
CERTIFICATE OF CORRECTION

Patent No. 3,603,767　　　　　　　　　　　Dated Sept. 7, 1971

Inventor(s) Edward A. Scicchitano

It is certified that error appears in the above-identified patent and that said Letters Patent are hereby corrected as shown below:

Column 6, line 27, after "claim 6" insert -- wherein said agent --; line 40, "20°F." should read -- 2°F. --.

Signed and sealed this 18th day of April 1972.

(SEAL)
Attest:

EDWARD M. FLETCHER, JR.　　　　　　　　ROBERT GOTTSCHALK
Attesting Officer　　　　　　　　　　　　Commissioner of Patents